June 16, 1964    N. J. PENNACHI ETAL    3,137,063
PIPE JOINING DEVICE

Filed Aug. 14, 1961    3 Sheets-Sheet 1

INVENTOR.
NATALE J. PENNACHI
NATALE A. PENNACHI
BY Barnes & Seed

ATTORNEYS

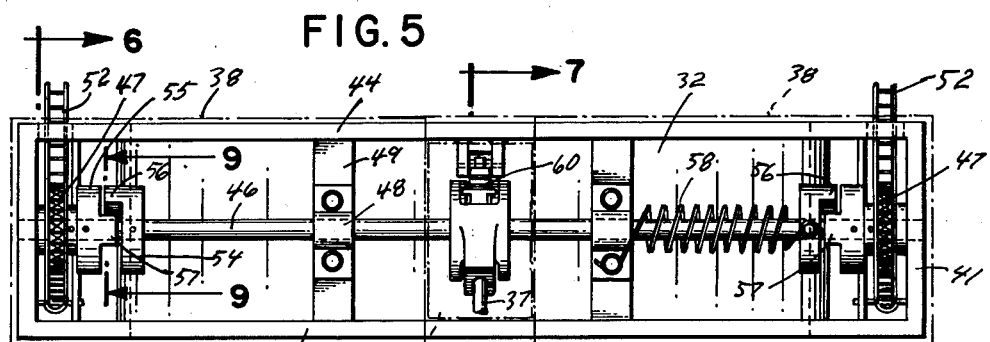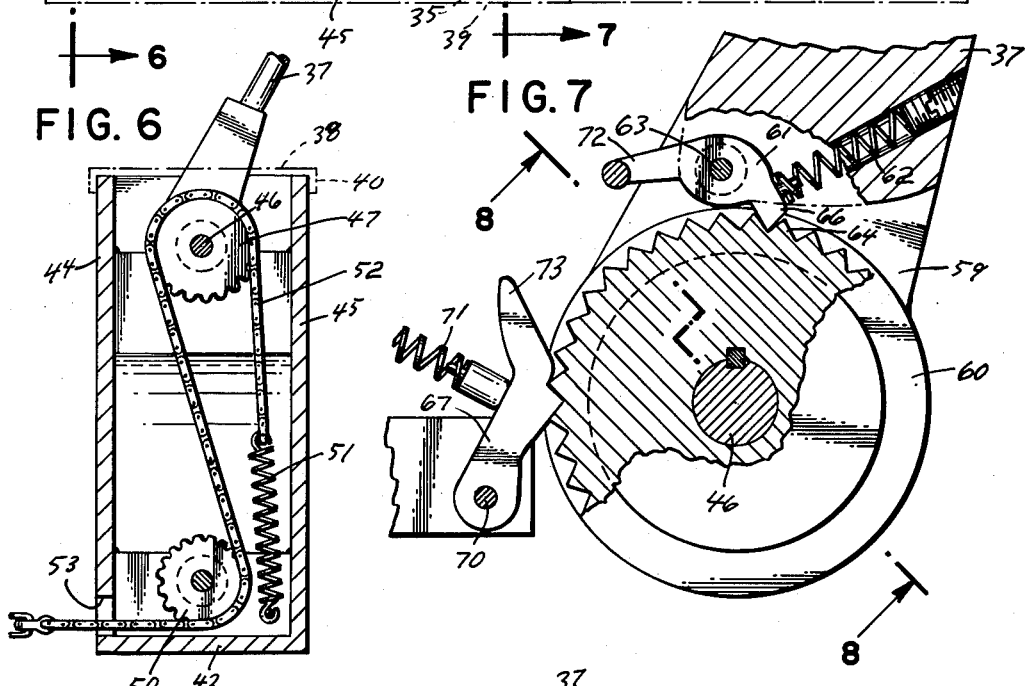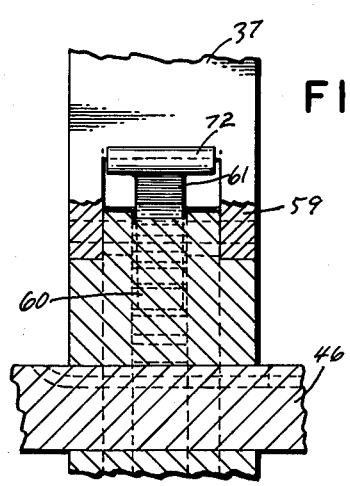

June 16, 1964  N. J. PENNACHI ETAL  3,137,063
PIPE JOINING DEVICE
Filed Aug. 14, 1961

INVENTOR.
NATALE J. PENNACHI
NATALE A. PENNACHI
BY
Barnes + Seed
ATTORNEYS

United States Patent Office 3,137,063
Patented June 16, 1964

3,137,063
PIPE JOINING DEVICE
Natale J. Pennachi, 20217 Marine View Drive, and Natale
A. Pennachi, 20715 2nd Ave. S., both of Seattle, Wash.
Filed Aug. 14, 1961, Ser. No. 131,308
5 Claims. (Cl. 29—237)

This invention relates to a pipe joining device and more particularly to a device adapted for field use in the construction industry to join sewer pipe sections of the type having bell and spigot portions sealed by an O-ring compressed therebetween.

It is a general object of this invention to provide an unusually compact and easily operated device adapted to evenly pull the spigot and related O-ring of one such pipe section into the bell of a previously laid pipe section so as to forcibly interfit the two sections.

It is a further object to provide a device which is so arranged as to be able to operate by engaging only the two pipe sections being joined at any one time, thus allowing other operations to be performed with respect to the previously laid pipe.

Another object is to provide this device with pull lines which operate in such a manner that the pipe sections are joined in proper alignment with one another.

Yet another object is to provide the device with pull lines which may be independently extended and secured to the pipe section to be joined, to thereby increase the ease of operation.

Further, this invention purports to provide an easily operated release means whereby said pull lines may be quickly disengaged.

In addition, it is an object to so provide clutch means in association with power means that even with each line being extended so as to be attached to a pipe section independently of the other line, positive drive is supplied to the lines in a manner that there is an equal rate of travel for each line.

Ancillary to the above, this invention provides spring means associated with said power means and clutch means, and spring means operatively secured to said pull lines to facilitate the securing, tensioning, and release of said lines.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 5 is a top plan view of the apparatus embodying preferred teachings of my invention, with the removable lid shown in broken lines;

FIG. 6 is a fragmentary vertical sectional longitudinal view taken on line 6—6 of FIG. 5;

FIG. 7 is a fragmentary vertical sectional longitudinal view taken on line 7—7 of FIG. 5;

FIG. 8 is a fragmentary sectional view taken on line 8—8 of FIG. 7;

Figure 13:
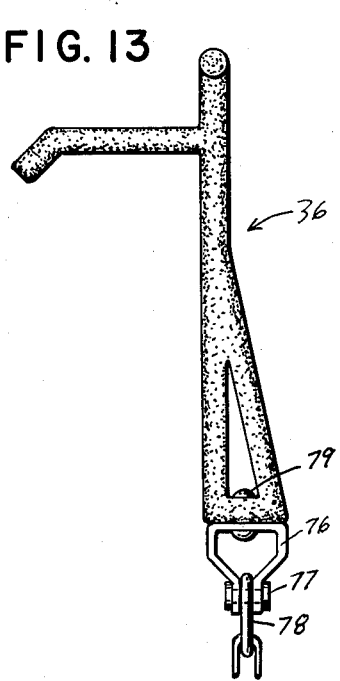
Figure 14:
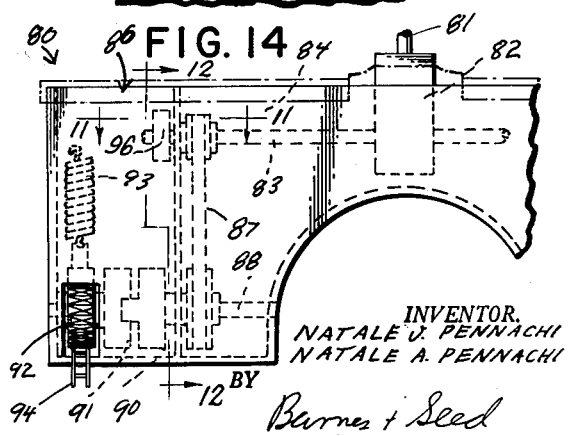

FIG. 13 details a hook which is secured to the free end of a related pull line; and FIG. 14 is a fragmentary front elevational view of a second embodiment of my invention.

Before attempting a detailed description of this invention, it is believed an understanding of the novel features thereof will be more readily obtained by first referring to the illustrations of the sewer pipe for use with which this invention particularly adapts itself.

The sections 10 of this pipe are of a bell and spigot type. The outer surface 14 of the spigot end 11 is dimensioned to sufficiently close tolerances so that a proper interfit may be formed between the spigot end and the mouth 13 of the bell end 12 of a second pipe section.

The bell end 12 has its inner surface, which defines its mouth, formed in three concentric portions. The outermost or end portion 15 of this inner surface is flared so as to guide the spigot end of the adjoining pipe into the bell mouth. Adjacent this flared portion 15 is the middle mouth portion 16 wihch is cylindrically shaped with a diameter moderately larger than the outside diameter of the spigot end so that an O-ring 17 may be compressed in the annular gap between the spigot surface 14 and this middle surface 16. The back or innermost mouth portion 18 is stepped from the middle portion 16 to a diameter only slightly larger than the outside surface 14 of the spigot end and at its innermost end is stepped vertically to form a transverse annular surface 19 whose inside edge adjoins the inner wall surface 20 of the main body of the pipe. When the pipe sections are properly joined, the front wall 21 of the spigot of an adjoining pipe section butts against the transverse stepped wall 20, and the outer spigot surface 14 fits closely within the innermost recess portion 18.

Because of the considerable bulk of these pipe sections, a crane (not shown in the drawings) is commonly used to lift individual sections for the installation thereof. Secured to the lower end of the crane cable 22 is a hook 23 shaped as a horizontal U member, the end of the upper arm 24 being secured to the cable and the elongated lower arm 26 reaching into the hollow interior of the pipe section to be lifted.

In operation, the arm 26 is inserted into the section through the bell end. The section is lifted and moved into alignement with the previously laid section, in a manner that the spigot end 11 of this suspended section is ready to fit into the flared portion 15 of the bell end 12 of the previously laid pipe section.

The O-ring 17 is placed over the spigot end of the suspended section. The two sections must now be drawn together in proper alignment with considerable force so as to form a proper interfit with the O-ring 17 compressed between middle portion 16 of the bell mouth 13 and the outer surface 14 of the spigot 11. It is during this phase of the pipe laying operation that the pipe joining apparatus of this invention comes into play.

Proceeding now to a general description of this pipe joining device, it is designated generally as 30 and comprises a hollow, saddle-like mounting frame 31 having a horizontal bridge 32 and two depending arms 33. In working position this saddle is located immediately behind the bell 12 of the last laid pipe section, with the saddle arms reaching on opposite sides of the section. Pull lines 34 extend one from each arm end with a hook 36 at the free end of each line. The two hooks are attached to the bell end of the suspended pipe section, and a lever arm 37 which is upstanding from the bridge 32 of the mounting saddle 31 is manually stroked in a reciprocating manner to activate a mechanism (to be particularly described hereinafter) to forcibly draw in the pull lines, thus tightly interfitting the two pipe sections. The lever arm 37 is then pushed sharply forward to engage a release mechanism (also to be described hereinafter) which removes tension from the pull lines 34. The saddle can then be moved to the bell of this last joined section and the same operation is followed to interfit another section of pipe.

Continuing to a detailed description of my pipe joining device, the saddle frame 31 is a completely enclosed hollow arch-like structure of uniform transverse cross-section having a top access opening closed by a removable cover. This top cover comprises two rectangular plates 38 fitting on opposite sides of the lever arm 37, and each having a depending positioning lip 40 which is anchored to the saddle frame by screws. A small frame 39 carrying a rubber diaphragm 35 is provided to fit around the lever arm 37 so that the cover section 38 in conjunction with this diaphragm enclose the saddle interior and yet allow the lever arm to operate. The bottom 42 of the saddle frame is in transverse section a semicircular concave wall having at each extremity short planar laterally extending wall portions 43 which join to the end walls 41. The front and back walls 44 and 45 respectively are parallel and have an identical arch-like form.

Journaled at its ends in the walls 41 and at intermediate points in bearings 48 mounted on braces 49 in the bridge portion 32, is a horizontal drive shaft 46. A pair of power sprocket wheels 47 are journaled on opposite ends of this drive shaft so that they are free to rotate independently of the shaft 46 and of one another.

Inside the lower end portion of each arm 33 is an idler sprocket wheel 50, each idler sprocket being journal mounted independently of the other but both being on the same transverse horizontal axis. A tension spring 51 is anchored in the lower end portion of each saddle arm at the back and has its free end attached to a respective sprocket chain 52. Each such chain extends from its spring up the inside of the related arm 33, over the top side of drive sprocket wheel 47 in meshing relationship therewith, and returns down the inside of the arm to pass beneath the idler sprocket 50, meshing therewith. Then the chain passes forwardly through a hole 53 in the saddle arm and is secured to a related pull line 34.

To transmit power to the pull lines from the drive shaft 46 a pair of clutches are provided at the sprocket wheels, each having one component 54 fixed to the shaft and another 55 to the sprocket. Each clutch component 54 has a jaw 56 directed toward the related sprocket and spaced from the axis of the shaft, and there is a matching jaw 57 provided by the corresponding component 55. These jaws 56–57 encompass a minor part of the circumference of the components 54–55 so that they may have a free run of almost a full revolution of the power sprocket in either direction before engaging one another. The purpose of this play is to allow the related pull line 34 to be extended a moderate amount without causing the drive sprocket 47 to become engaged by its related clutch to the drive shaft.

A tension spring 58 encircles the shaft 46, one end of the spring being attached to the saddle structure at the brace 48, and the other end being secured to the shaft. The action of this spring is to rotate the shaft in a direction which is counterclockwise, as viewed from a left hand vantage point (from which FIG. 6 is taken). This vantage point will be used herein for determining clockwise or counterclockwise movements of all rotating parts.

Keyed to the shaft 46 at its midlength between forks 59 on the lower end of the pull lever is a concentric ratchet wheel 60. These forks are journaled on the shaft 46 and have a drive pawl 61 pivotally mounted therebetween which is depressed by a spring 62 housed in the lever to engage by its tooth 66 with the ratchet teeth 64. The pivot pin 63 of the pawl is forward of the pawl tooth 66, so that as the lever 37 is pushed forward, the pawl tooth 66 slides over the ratchet teeth, and as the lever is pulled rearwardly the pawl tooth engages the ratchet wheel to rotate the shaft clockwise (as viewed in FIG. 7). Thus, by reciprocating strokes of the lever 37, the shaft 46 is rotated clockwise by increments of travel.

A holding pawl 67 is pivotally mounted on the saddle with its pivot pin 70 also located forward of its pawl tooth 68, which is depressed by a spring 71 to bear against the ratchet teeth 64. The action of this holding pawl is to prevent counter-clockwise movement of the ratchet while allowing the clockwise progress thereof during power strokes of the lever 37.

Extending forwardly of the pivot point 63 and rigidly connected to the drive pawl 61 is a release arm 72, and it should be noted that the holding pawl has a rearwardly extending arm 73 which slants away from the ratchet wheel 60. Thus, if the lever arm 37 is pushed far forward deliberately (i.e. beyond its normal working stroke), the release arm 72 will engage the back face of the arm 73 so as to lift each pawl against its related depressing spring. This action lifts the drive pawl tooth 66 and the holding tooth 68 almost simultaneously to free the ratchet wheel 60.

The specific operation of the pipe joining device will now be described. The saddle 31 is placed on the body of the last laid pipe section 10 immediately behind the bell 12, with its semicircular concavity 42 closely fitting the outside surface of pipe. The pipe section 10 to be joined is carried by the crane so that the spigot 11 of the suspended section becomes positioned directly in front of the bell 12 behind which the saddle is mounted. The O-ring 17 is then inserted over the spigot end of the suspended section. The operator now pulls one of the hooks 36 forward and secures it over the bell end of the suspended section. The hook 36 is attached to the pull line by means of a U-shaped fastener 76 which has a pin 77 passing between the end portions thereof to join the fastener to the final link 78 of its pull line. A rivet 79 joins the hook to the body of the fastener, allowing swivel motion therewith. Since the fastener 76 is able to pivot freely in any direction and the rivet 79 allows the hook to rotate with respect to the fastener, each hook may be easily fastened and loosened in many successive operations without undue twisting of its line. As the line is extended, its related chain 52 pays out and tensions the spring 51, while the meshing drive sprocket 47 and idler sprocket 50 freely rotate to allow the extending of the line.

Particular attention should be directed to the manner in which the clutch jaws 56 and 57 cooperate to allow this line extension. The ratchet wheel 60 rests ordinarily in locked position, i.e. with the holding pawl 67 depressed against the ratchet wheel 60. As previously noted, the shaft spring 58 acts to rotate the shaft 46 counter-clockwise. Now with the ratchet wheel 60 having been released after its last use, the clutch member 54 would have already rotated counter-clockwise by virtue of the spring 58 until the jaw 56 contacts the jaw 57. Now as the line 34 is extended, the drive sprocket 47 is free to be turned counter-clockwise (against the tension exerted by the spring 51) so that the drive sprocket can make almost a complete revolution before the jaw 56 stops further motion by again contacting the sprocket jaw 57. In practice, the line is seldom extended that far, a half or three quarter turn of the drive sprocket usually paying out sufficient line so that the hook 36 can be secured over the bell end of the suspended section.

The second hook 36 is now attached to the bell end of the suspended section in the same manner, with the same action taking place with its respective cooperating members. It is important to note that often the suspended pipe section is not precisely aligned, and consequently one pull line will have to be extended further than the other. But the tension springs 51 each hold their respective pull lines taut and exert sufficient force to bring the spigot end of the suspended section against the bell end of the previously laid section on which the pulling device is seated.

With both pull lines attached, the operator begins the reciprocating stroke of the lever arm 37. As hereinbefore described, the action of the ratchet mechanism (60–73) is to move the shaft 46 clockwise by increments. Since both jaws 56 are firmly secured to the shaft 46 and each occupies the same angular location with respect to the shaft, if one line is extended further than the other (thereby causing its related power sprocket 47 to be advanced counter-clockwise a greater amount, its related clutch jaw 56 will engage the jaw 57 on this power sprocket 47 before the other clutch mechanism engages, and will carry this power sprocket alone in a clockwise direction. When this engaged power sprocket has reached the same angular location as the other power sprocket, the other jaw 56 will engage its related jaw 57, and both power sprockets now in identical angular positions will be carried clockwise by equal increments of travel, each sprocket thus maintaining the same angular position as the other.

To illustrate this more clearly, refer to the showing of FIGURE 5. In this showing the power sprockets 47 are at the same angular position, and the jaws 56 are just beginning to engage the jaws 57 so that if the lever 37 is stroked one more cycle, the jaws will engage and pull in the lines 34 a certain increment. Now picture mentally that the jaws 56 are backed off in a counter-clockwise direction about a quarter turn, and then imagine that the pipe section to be joined has its bell end skewed to the left. The right hand pull line will have to be extended further to reach the bell end of the suspended section, and consequently the power sprocket jaw 57 will move counter-clockwise (or will move forward as seen in FIG. 5) as the line is extended. When the lever arm 37 is reciprocated, moving the jaws 56 clockwise, each jaw 56, by virtue of its rigid attachment to the shaft 46, maintains the same angular position as the other. The right hand jaw 56 will contact its related jaw 57 first and will move this jaw 57 back until each power sprocket is at the same angular location. The effect of this will be to pull the right hand line in separately until the suspended pipe section is brought into proper alignment. At this point both jaws 56 will be in engagement each with its related jaw 57 and each line will begin to be pulled in by equal increments, thus maintaining proper alignment of the suspended pipe section while it is being forcibly interfiitted with the other.

Because of the force multiplying effect of the lever arm 37, considerable force will be exerted on the pull lines 34 to compress the O-ring 17 between the bell mouth 13 and the spigot 11. When the snug interfit of the suspended pipe section is accomplished, the operator then pushes the lever 37 far forward (i.e. beyond the normal travel of the working strokes). The release arm 72 of the drive pawl 61 engages the arm 73 of the holding pawl 67 to lift the two pawl teeth 66 and 68 and free the ratchet wheel 60. As soon as the ratchet wheel is freed, the shaft spring 58 quickly rotates the shaft 46 almost a complete revolution counter-clockwise until the jaws 56 meet the jaws 57. As seen in FIG. 5, when the shaft 46 is released, the jaws 56 will move from a position forward of the jaws 57 to behind the jaws 57. The purpose of this is that when the saddle is moved to the next bell section, the pull lines 34 may again be extended without having the jaws 57 of the power sprockets engaging the jaws 56 during this extension of the lines.

Figure 1:
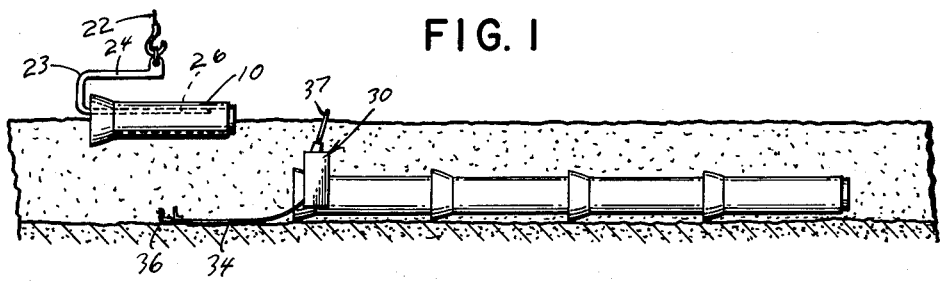
FIGURE 1 is a side elevational view showing the apparatus of my invention mounted behind the bell end of the last laid pipe section, with a suspended pipe section being carried into alignment therewith.
Figure 2:
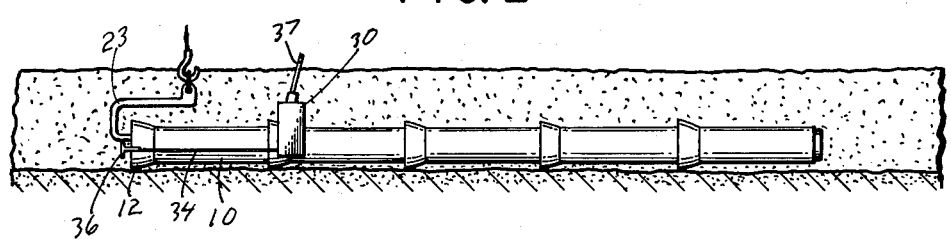
FIG. 2 is a view similar to FIG. 1, with the apparatus of my invention in operative position with respect to the suspended pipe section of FIG. 1.
Figure 3:
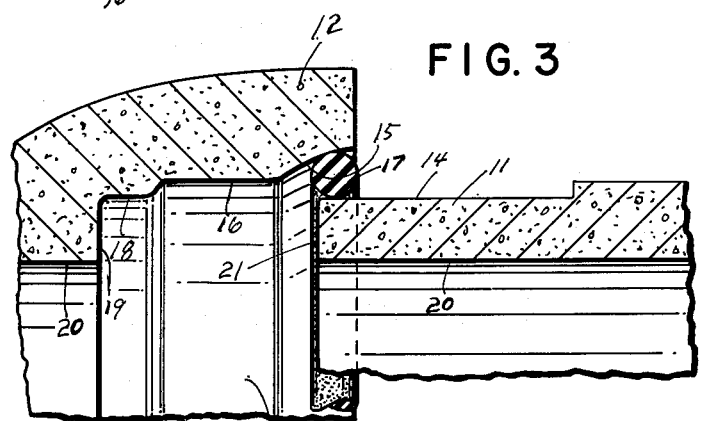
FIG. 3 is a fragmentary longitudinal sectional view detailing the bell and spigot portion of two pipe sections to be joined, the relative position thereof being such that there has been no forcible interfit of the two sections.
Figure 4:
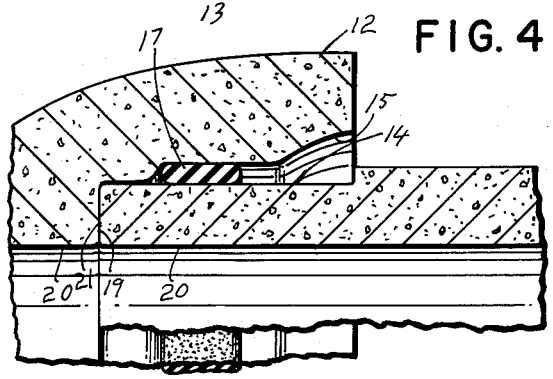
FIG. 4 shows a view similar to that of FIG. 3, but with the forcible interfit of the two pipe sections having been completed.
Figure 9:
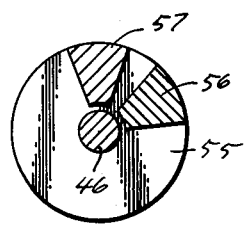
FIG. 9 is a vertical sectional view taken on line 9—9 of FIG. 5.
Figure 10:
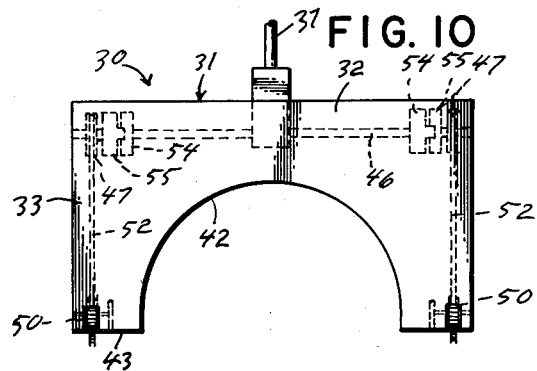
FIG. 10 is a front elevational view of the apparatus of my invention.
Figure 11:
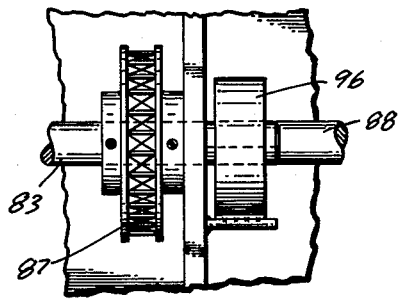
FIG. 11 is a fragmentary top plan view taken on line 11—11 of FIG. 14 and detailing the chain and sprocket transmission of a modification of my invention.
Figure 12:
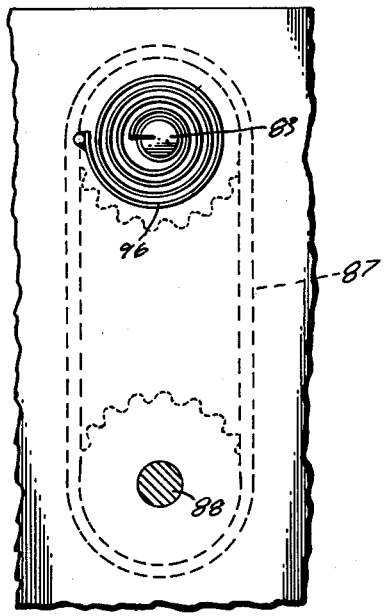
FIG. 12 is a fragmentary vertical sectional longitudinal view taken on line 12—12 of FIG. 14.

FIGURES 11, 12, and 14 show a modification of my invention. The operation of this device, designated generally as 80, is in many respects the same as that of the previously described device 30. Therefore, it is believed a less detailed description will suffice to explain its structure and operation.

The lever arm 81 and ratchet mechanism 82 are substantially identical to the lever arm 37 and the ratchet mechanism 60–73 of the device 30. The power shaft 83 is journal mounted in the bridge 84 of a slightly widened saddle 86. There is a chain and sprocket transmission 87 at each end of the shaft 84 to supply positive drive to a related one of two shafts 88, located at the lower end of the related saddle arm 90. Each shaft 88 carries a clutch mechanism 91 similar in structure and operation to the clutch mechanism 54–57. The power sprocket 92 cooperates with the clutch mechanism 91 in the same manner as does the power sprocket 47 with its clutch mechanism. The chain tensioning spring 93 is anchored at the upper end of its saddle arm 90, and a chain 94 passes underneath its power sprocket 92 (meshing therewith) to connect to its related pull line. There is a torsional coil spring 96 which is attached to the shaft 83 and acts in the same manner as the spring 59 of the device 30.

The primary advantage of this latter described device is that by a proper selection of the sprocket wheels in the chain and sprocket transmission 87, the force transmitted from the lever arm to the pull lines may be further multiplied.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What we claim is:

1. In a device for pulling together in sealed interfitting relationship a pair of sewer pipe sections of the type having interfitting bell and spigot portions sealed by an O-ring compressed therebetween, a generally U-shaped hollow saddle with depending legs and an upper bridge therebetween collectively defining a generally semi-circular downwardly facing concavity for seating against the bell of one pipe section which is to receive the spigot of a second, said saddle legs having a pair of pull line openings therethrough at substantially diametrically opposite sides of said concavity, a pair of axially aligned sprockets journal mounted at the top of said legs, a shaft journal mounted on said bridge between said sprockets, a ratchet wheel on said shaft, a pull lever operatively associated with said ratchet wheel, clutch means operatively interconnecting said shaft and sprockets responsive to powering of said ratchet wheel by said pull lever, said clutch means permitting a partial rotation of said sprockets relative to one another and to said shaft, pull line means issuing from said leg openings for gripping the bell end of said second pipe section and having respective chain sections engaging said sprockets, and tension spring means anchored in said saddle legs and connected to said chain sections for yieldingly resisting withdrawal of said pull line means from said openings.

2. The structure as recited in claim 1, wherein said ratchet means includes a pawl mounted in said saddle for engaging said wheel and a pawl releasing means hanging from said pull lever for disengaging said pawl responsive to pressure on and movement of said pull lever opposite to that for powering the ratchet.

3. In a device for pulling together in sealed interfitting relation a pair of sewer pipe sections of the type having bell and spigot portions sealed by an O-ring compressed therebetween, a saddle for seating against the bell of one pipe section which is to receive the spigot of a second, a pair of pull lines guided by said saddle at approximately diametrically opposite points thereof and having respective independent means at their free ends for gripping of the second pipe section, a pair of pull members independently journal-mounted on said saddle and each engaged by a related of said pull lines, a retrieving member journal mounted on said saddle and located between said rotary pull members, clutch means operative between said retrieving member and said pull members, so that by rotation of said retrieving member said pull members may be rotated to draw in said pull lines, said clutch means comprising a pair of jaws, one mounted on each pull member and spaced from the axis of rotation of said pull member, and comprising a second pair of jaws mounted on said retrieving member, each positioned for engagement with a related one of said first named jaws, each jaw occupying a relatively small portion of the circumferential path of travel so that there is a free run of almost an entire revolution of said pull member, thus allowing the independent extension of each pull line without engaging the related clutch mechanism.

4. In a device for pulling together in sealed interfitting relation a pair of sewer pipe sections of the type having bell and spigot portions sealed by an O-ring compressed therebetween, a saddle for seating against the bell of one pipe section which is to receive the spigot of a second, a pair of pull lines guided by said saddle at approximately diametrically opposite points thereof and having respective independent means at their free ends for gripping of the second pipe section, a pair of rotary pull members journal-mounted on said saddle for independent rotation and each positively engaged by a related of said pull lines, a retrieving member journal-mounted on said saddle and located between said rotary pull members, and clutch means operative between said retrieving member and said rotary pull members so that by rotation of said retrieving member said pull members may be rotated to draw in said pull lines, said clutch means permitting partial turning of said pull members relative to said retrieving member and relative to one another whereby each pull line can be independently manipulated to bring its free end into gripping relation to the second pipe section.

5. In a device for pulling together in sealed interfitting relation a pair of sewer pipe sections of the type having bell and spigot portions sealed by an O-ring compressed therebetween, a saddle for seating against the bell of one pipe section which is to receive the spigot of a second, a pair of pull lines guided by said saddle at approximately diametrically opposite points thereof and having respective independent means at their free ends for independently gripping the second pipe section, a pair of rotary pull members journal-mounted on said saddle for independent rotation and each positively engaged by a related of said pull members, a rotary retrieving member journal-mounted on said saddle and located between said pull members, each pull member and said retrieving member having cooperating clutch jaws permitting independent partial rotation of the pull members relative to the retrieving member while providing a positive drive from said retrieving member to each pull member when the respective clutch jaws are engaged, spring means operatively connected to each pull line to yieldingly resist extension of such during said independent partial rotation thereof whereby each pull line can be independently manipulated to bring the free end into gripping relation to the second pipe section, and ratchet means operatively connected to said retrieving member for turning the latter in the direction pulling the free ends of the pull lines toward said saddle.

References Cited in the file of this patent

UNITED STATES PATENTS

| | | |
|---|---|---|
| 769,994 | Fererro | Sept. 13, 1904 |
| 979,488 | Heberling | Dec. 27, 1910 |
| 2,399,312 | Augustine | Apr. 30, 1946 |
| 2,670,924 | Baty | Mar. 2, 1954 |
| 2,898,083 | Kresl | Aug. 4, 1959 |